Oct. 26, 1948.　　　　　P. W. GUMAER　　　　　2,452,122
APPARATUS AND PROCESS FOR TESTING MATERIALS
Filed Nov. 15, 1943　　　　　　　　　　　　7 Sheets-Sheet 1
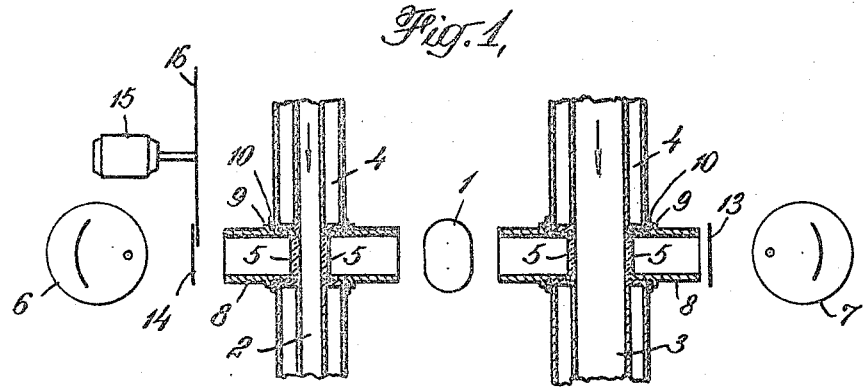
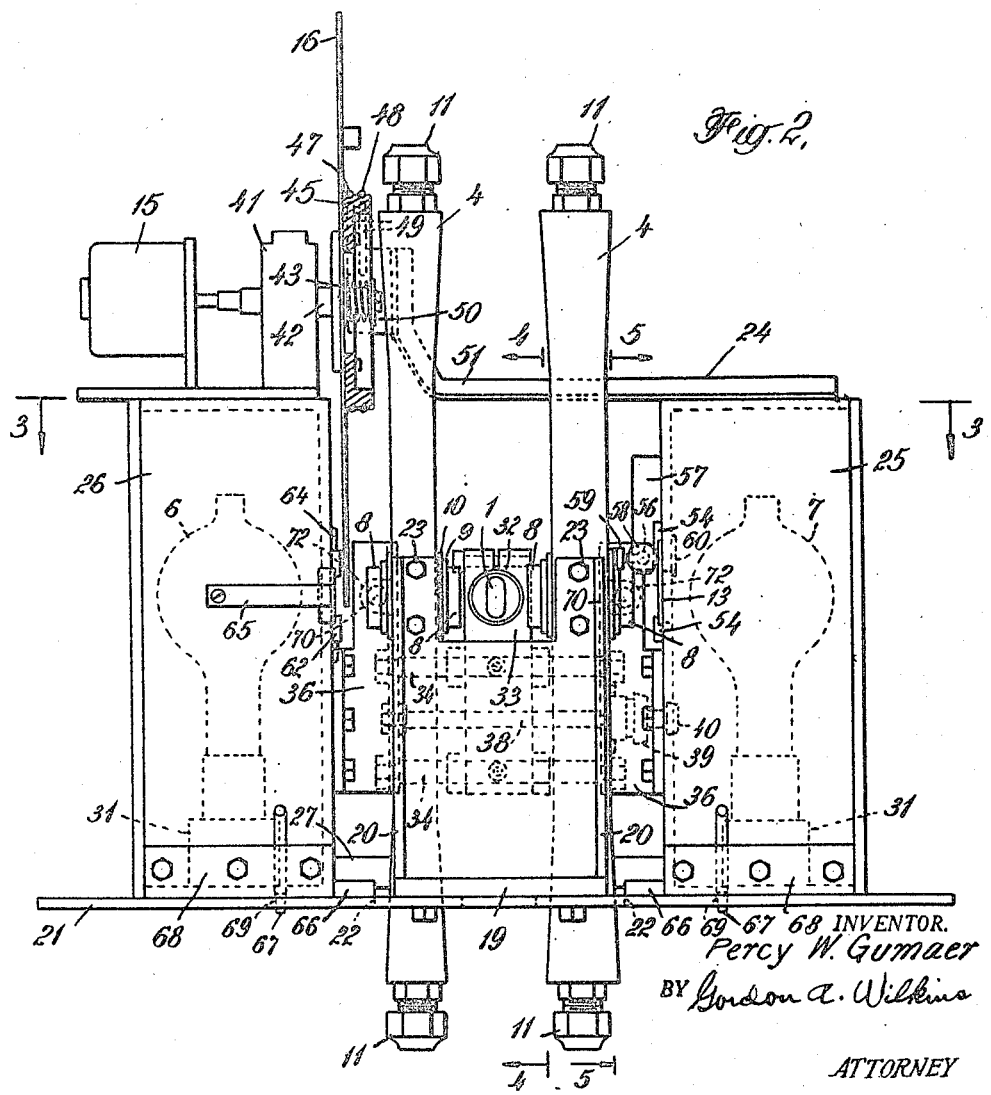
INVENTOR.
Percy W. Gumaer
BY Gordon A. Wilkins
ATTORNEY

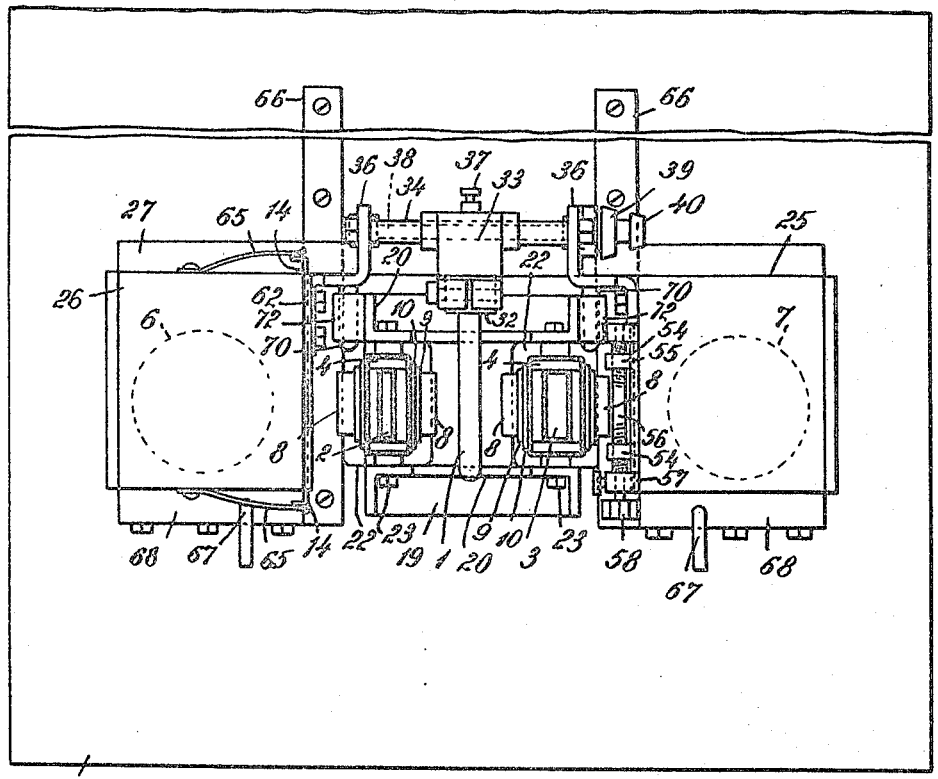
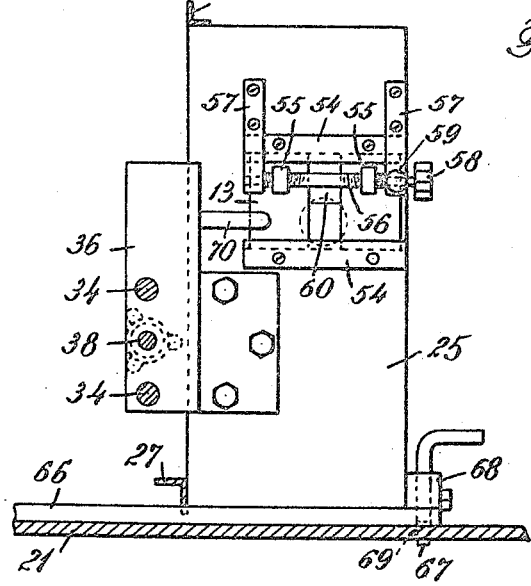

Oct. 26, 1948.                P. W. GUMAER                2,452,122
                APPARATUS AND PROCESS FOR TESTING MATERIALS
Filed Nov. 15, 1943                              7 Sheets-Sheet 3
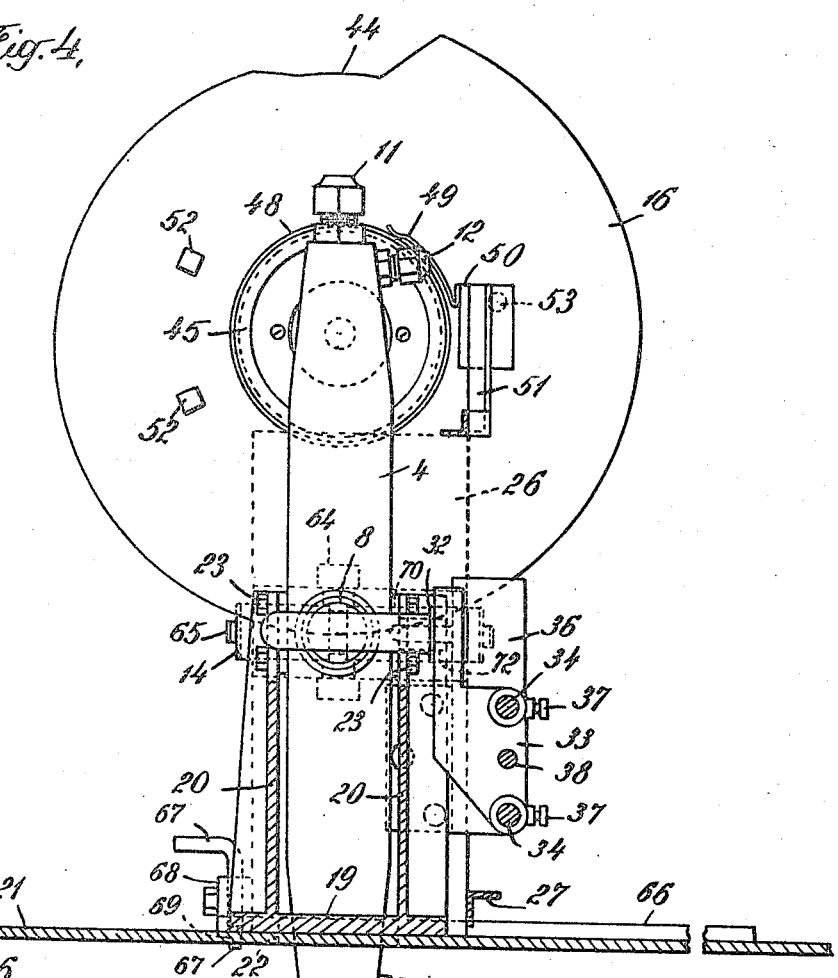
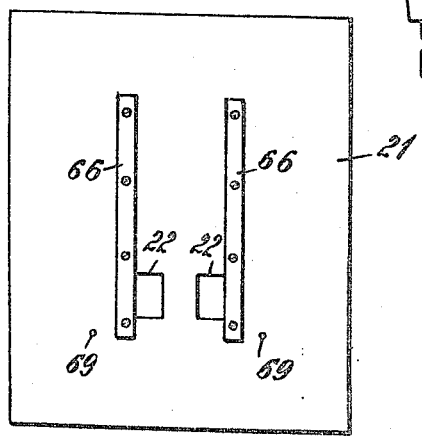
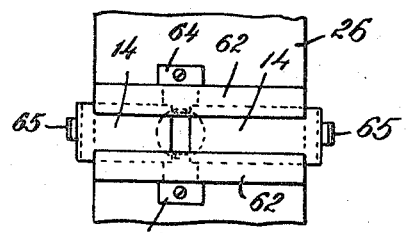
INVENTOR.
Percy W. Gumaer
BY Gordon A. Wilkins
ATTORNEY

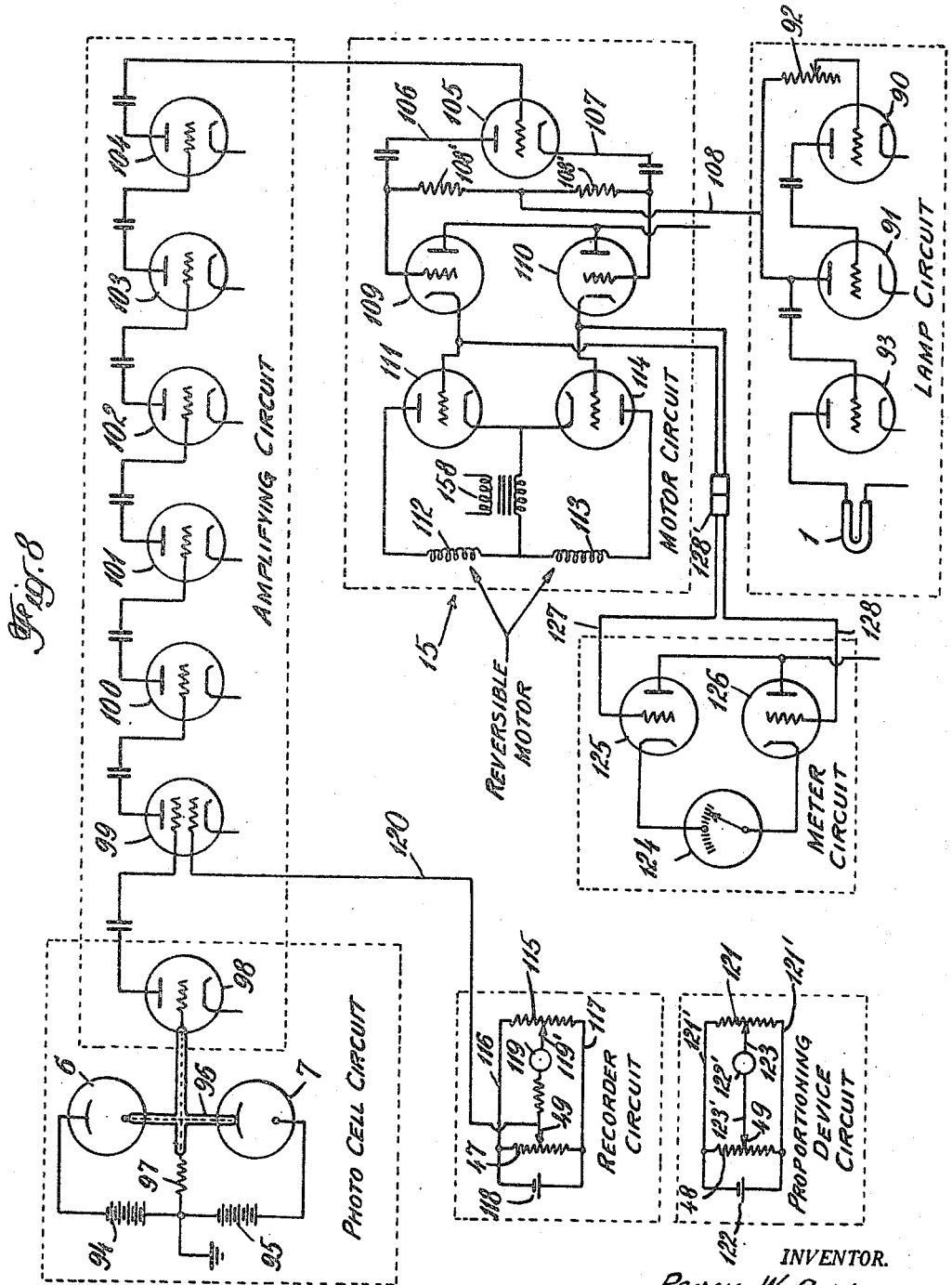

Patented Oct. 26, 1948

2,452,122

UNITED STATES PATENT OFFICE 2,452,122

APPARATUS AND PROCESS FOR TESTING MATERIALS

Percy W. Gumaer, West Englewood, N. J., assignor to Allied Chemical & Dye Corporation, New York, N. Y., a corporation of New York Application November 15, 1943, Serial No. 510,369

17 Claims. (Cl. 250—43)

This invention relates to fluid analysis and more particularly to an improved apparatus and process for analyzing fluids.

Heretofore, it has been proposed to analyze fluids by directing beams of light through the material to be analyzed and a reference standard, respectively, and thence onto photoelectric cells connected in opposition in a circuit so that variation in the material undergoing analysis varies the amount of light absorbed by and transmitted through the material onto one of the photoelectric cells. The resultant variations in the electrical conditions in the photoelectric cell circuit are utilized to operate indicating or recording apparatus or apparatus for varying the composition of the material being analyzed. In such apparatus the reference standard may be, for example, a glass filter or the beams of light may pass through the fluid respectively before and after addition of a reagent which changes the optical properties of the fluid proportionately to its content of a constituent to be measured.

While such apparatus may be satisfactorily employed for the analysis of many fluids, conditions are frequently encountered which introduce relatively large cumulative errors. For example, where the fluid undergoing analysis is chemically reactive under the influence of light, causing formation of light-absorbing film on the walls of the container in which the light is passed through the fluid, the film introduces progressively increasing errors in the analysis. For instance, naphthalene strongly absorbs ultraviolet light of appropriate wave length while air is substantially transparent to such light so it might be supposed that the naphthalene content of naphthalene-air mixtures could be continuously determined by passing a beam of ultraviolet light through a flowing stream of the mixture and another beam through air, respectively, onto two photoelectric cells connected in opposition and recording the electrical condition of the photoelectric cell circuit. It has been found, however, that the naphthalene undergoes chemical reaction under the influence of ultraviolet light and forms light-absorbing film on the walls of the container in which naphthalene-air mixtures are subjected to the influence of such light. This film formation introduces large errors in the analysis, which errors progressively increase as the analysis proceeds.

It is an object of the invention to provide an improved apparatus and process for testing fluids.

It is another object of the invention to provide a process and apparatus for utilizing light in the continuous analysis of fluids containing a constituent subject to optical change under the influence of light.

It is a further object of the invention to provide a novel compact apparatus involving few moving parts for the analysis of fluids.

A further object of the invention is to provide a fluid analyzer involving an electric circuit of high sensitivity to variations in the optical properties of the material analyzed. Other objects and advantages will appear hereinafter.

In accordance with the invention, beams of light of wave length such that it is more strongly absorbed by a constituent of the fluid to be tested than by the remainder of the fluid are passed, respectively, through two streams of the fluid of different thickness flowing through two fluid channels and thence to two light-sensitive elements connected in opposition in an electric circuit. Variation in the amount of the constituent in the fluid varies the relative amounts of light falling on the light-sensitive elements and hence varies flow of current in the circuit. Means responsive to variation in the current flow effect operation of shutter means controlling the relative amounts of light reaching the light-sensitive elements to restore the circuit to a predetermined condition. The variations in flow of the current are also preferably utilized to control the operation of an indicator or a recorder which may be appropriately calibrated to indicate or record the amounts of the constituent present in the fluid and may also control the operation of apparatus for regulating the composition of the fluid.

Preferably, the invention involves a source of pulsating light energized by current of appropriate frequency and adjustable to various positions between the fluid channels, two photoelectric cells receiving light transmitted from the light source through the fluid flowing in the respective channels, and an electric circuit involving a resistance in which the photoelectric cells are connected in opposition so the photoelectric cell currents tend to flow in opposite directions through the resistance. When equal amounts of light reach the photoelectric cells the currents balance each other and no current flows through the resistance. When one cell receives more light than the other, current having an alternating component of the frequency of the light-energizing current flows in one direction through the resistance and when the other cell receives more light similar current flows in the other direction through the resistance. Thus, as will appear more clearly hereinafter, the current flowing through the resistance when one photoelectric cell receives more light is 180° out-of-phase with the current through the resistance when the other cell receives more light.

The alternating current component of the voltage drop across the resistance is amplified by electronic amplifying means tuned to the frequency of the current energizing the light source. The amplified voltage is employed, as more fully described hereinafter, to control the circuit of a reversible motor operating a rotary shutter which intercepts a gradually increasing or decreasing amount of light passing from the thinner fluid channel to its photoelectric cell depending on the direction of rotation of the shutter. When, owing to variations in the composition of the fluid, the intensity of the light transmitted through either fluid channel to its associated photoelectric cell becomes greater than the intensity of the light reaching the other photoelectric cell through the other fluid channel, the motor circuit is energized to rotate the shutter in the direction to equalize the amounts of light reaching the photoelectric cells, and when the shutter reaches a position such that both cells receive equal amounts of light the motor circuit is de-energized and remains de-energized until the intensity of light reaching the photo cells again becomes unequal. The motor and shutter remain stationary as long as the composition of the fluid flowing through the fluid channels does not vary. However, when the composition of the fluid varies, with consequent variation in the light-absorbing characteristics of the fluid, the amounts of light absorbed in the thicker and thinner fluid channels vary accordingly and the shutter is rotated in one direction or the other to equalize the amounts of light reaching the photoelectric cells. Thus each position of the rotary shutter corresponds to a definite light-absorbing capacity of the fluid passing through the channels. Since the light-absorbing capacity of the fluid depends on its content of light-absorbing constituent, the movement of the rotary shutter may be recorded on a scale calibrated in terms of the concentration of such constituent.

An important advantage of the invention is that it permits accurate continuous analysis of fluids which are reactive in the presence of the light employed in the analysis and deposit film on the walls of the analyzing apparatus. By adjusting the position of the light source so that equal deposition of film occurs on the walls of both fluid channels, the films exert equal opposite optical effects in the analysis and hence do not affect the accuracy of the analysis. Furthermore, the invention renders the analysis substantially independent of variables such as changing light intensity, varying characteristics of the amplifying tubes employed, varying conductivity of the photoelectric cells, and minimizes the effect of expansion of the apparatus due to temperature changes. The analyzer is extremely sensitive to small variations in the optical characteristics of the fluid analyzed. Naphthalene vapor-air mixtures, for example, may be continuously analyzed for periods of several days, without interim adjustment of the apparatus, with a high degree of accuracy.

For a more complete understanding of the invention, reference may be had to the following description in conjunction with the accompanying drawing illustrating a preferred embodiment of the invention in which, Figure 1 is a diagrammatic fragmentary view in front elevation, parts being shown in section, illustrating the relative positions of the light source, fluid channels, shutters and photoelectric cells;

Figure 2 is a front elevation, parts being shown in section;

Figure 3 is a sectional view on line 3—3 of Figure 2 looking in the direction of the arrows, parts being omitted for the sake of clarity;

Figure 4 is a sectional view on line 4—4 of Figure 2 taken in the direction of the arrows;

Figure 5 is a sectional view on line 5—5 of Figure 2 in the direction of the arrows;

Figure 6 is a top plan view of the base plate on which the apparatus is mounted;

Figure 7 is a fragmentary view in elevation illustrating one set of manually adjustable shutters;

Figure 8 is a simplified wiring diagram illustrative of the analyzer electric circuit;

Figure 9:
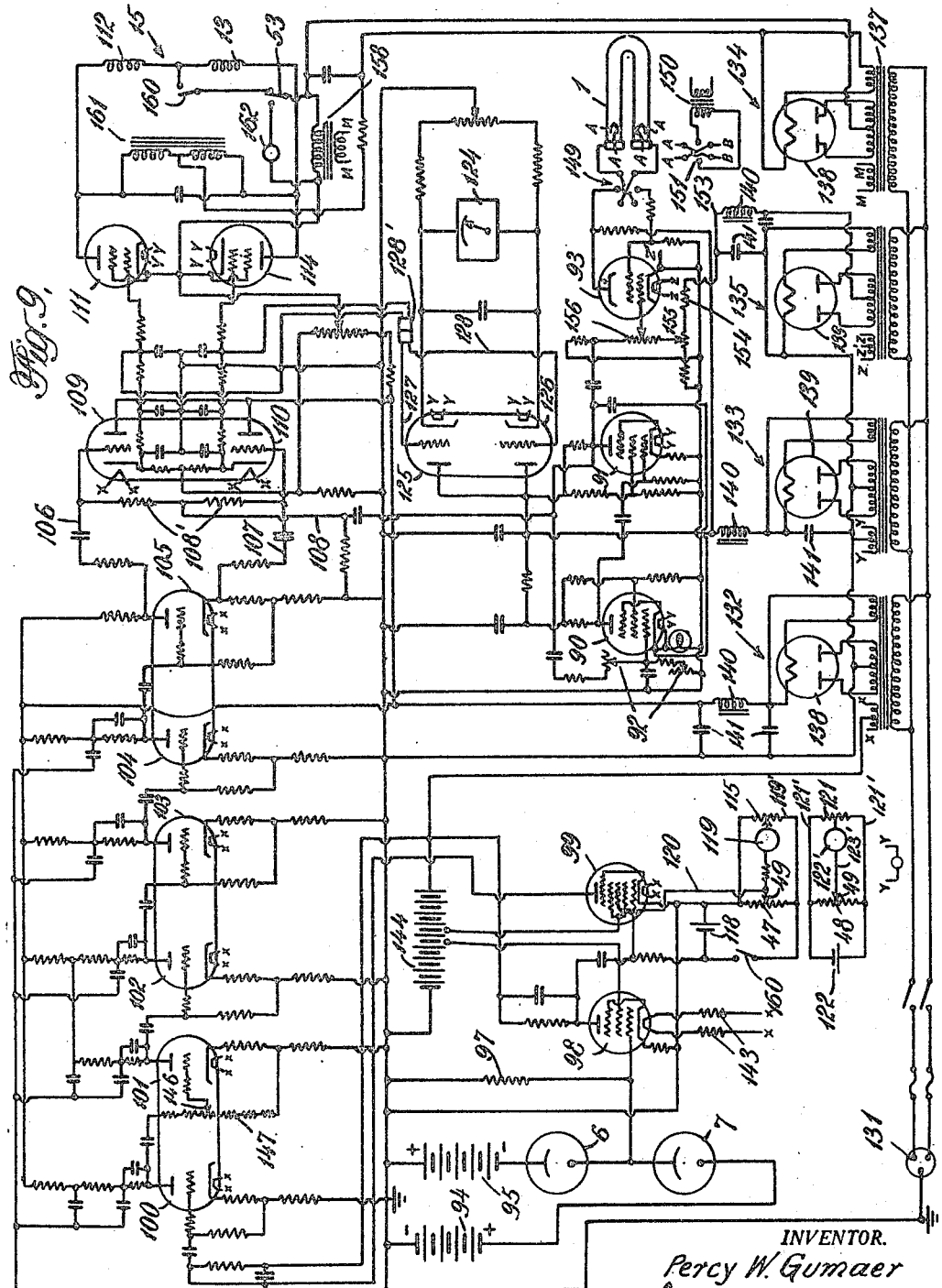
Figure 9 is a wiring diagram showing the electrical connections in more detail than Figure 8.

For convenience, the invention will be described in connection with the analysis of a mixture of naphthalene vapor and air containing about .4 to 1 mol per cent of naphthalene suitable for conversion to phthalic anhydride in conventional catalytic oxidation converters. Naphthalene vapor strongly absorbs ultraviolet light of wave length within the range of at least 2000 to 3200 Angstrom units while air is substantially transparent to such light and hence accurate determination of the amount of light of given intensity absorbed by a body or stream of naphthalene vapor-air mixture of given thickness would afford a basis for calculating the naphthalene content of the mixture. However, as hereinabove pointed out, naphthalene vapor undergoes chemical reaction in the presence of ultraviolet light and deposits light-absorbing film on the inner walls of chambers in which it is subjected to the action of such light and this film introduces serious errors into the analysis.

Referring to Figures 1–7 and more particularly to the diagrammatic view shown in Figure 1 of the drawing, reference numeral 1 designates a suitable source of ultraviolet light, such as a 4-watt germicidal mercury vapor ultraviolet lamp emitting ultraviolet light of a wave length of substantially 2537 Angstrom units, and 2, 3 are two fluid channels of unequal thickness surrounded by steam jackets 4. The channels are equipped with removable windows or light-transmissive wall portions 5, which are of quartz or other material transparent or substantially transparent to the light from source 1. 6 and 7 are two photoelectric cells sensitive to ultraviolet light of the wave length absorbed by naphthalene but not absorbed by air and relatively insensitive to visual light. For analyzing naphthalene vapor-air mixtures, the photoelectric cells are preferably of the tantalum cathode type, such as the tubes known commercially as Westinghouse WL775, although any photoelectric cell sensitive to ultraviolet light of the wave length absorbed by naphthalene but not absorbed by air and preferably relatively insensitive to visual light may be employed. Photoelectric cells 6 and 7 are located in alignment with light source 1 and windows 5, as shown in Figure 1, so that light passes from the source through the respective fluid channels to the respective photoelectric cells. Fluid channel 2 may conveniently be ¼" thick (inside dimensions) and channel 3 about ½" thick for analysis of naphthalene vapor-air mixtures containing, say, from about .4 to 1 mol per cent of naphthalene.

Windows 5 are mounted, e. g. cemented, in the inner ends of exteriorly threaded metal tubular holders 8, which may be readily screwed into or removed from threaded apertures in the side walls of channels 2 and 3 so that the inner surfaces of the windows and the inner ends of the holders are flush with the interior walls of the channels when in operative position. The channels are preferably designed to promote stream-line flow of fluid therethrough. The inside surfaces of the holders may be blackened to minimize reflection of light therefrom and may be fairly long, e. g. 1⅞" in length, so that only nearly parallel beams of light pass through the windows; making the holders fairly long also serves to minimize circulation of cold air over the outsides of windows 5 and hence prevents condensation of naphthalene on the insides of the windows; the outer surfaces of the holders and of the steam jackets 4 may be covered with aluminum foil to reduce heat losses due to radiation. For measurement of naphthalene concentration, the holders may conveniently be about 1⅜" in diameter. In order to promote accurate fluid-tight positioning of the windows the tubular holders are provided with exterior flanges 9 which bear against suitable gaskets 10, the flanges being provided with vernier marks which cooperate with vernier marks on the exterior walls of the steam jackets so as to indicate when the holders have been tightened to the desired extent. The fluid channels are equipped with connections 11 (see Figure 4) for flow of naphthalene vapor-air mixture to be analyzed through the channels and the steam jackets are equipped with connections 12 for flow of steam therethrough.

Reference numeral 13 designates a pair of adjustable shutters for manually varying the dimensions of the light path from light source 1 to photoelectric cell 7, and 14 is a pair of removable shutters located between the photoelectric cell 6 and the thinner fluid channel 2 for a purpose hereinafter described. 15 is a two-phase reversible electric motor connected to drive a rotary shutter 16 having a spiral periphery extending into the light path from light source 1 to photoelectric cell 6, so as to vary the amount of light reaching cell 6 as the shutter is rotated, as described in more detail hereinafter.

Figures 2, 3, 4 and 6 illustrate in detail the arrangement for supporting the fluid channels in operative relation to other elements of the apparatus. As shown in these figures, a support 19 having parallel upstanding portions 20 is bolted to base plate 21, and fluid channels 2 and 3 extend through openings 22 in the base plate and registering openings in the support. The channels are secured between the upstanding portions 20 of the support by set screws 23 at about the level of windows 5.

Reference numeral 24 designates generally a unitary removable supporting frame for supporting the light source, photoelectric cells and shutters in readily removable and accurately replaceable relation with respect to the fluid channel windows. The frame involves two cast iron enclosures or boxes 25, 26 secured together by angle iron 27, each box containing a support 31 for supporting one of the photoelectric cells therewithin.

Light source 1 is mounted in base 32 (see especially Figures 2, 3 and 4) equipped with appropriate electric connections (not shown in Figures 1-7), which base is held by clamp 33. The clamp is slidably mounted on two rods 34 bolted in members 36 secured to boxes 25 and 26, respectively, as clearly indicated in Figure 3 of the drawings. Set screws 37 extend through clamp 33 for securing it in any desired position along the rods. For the purpose of accurately adjusting the lamp horizontally, threaded shaft 38 journalled in members 36 is threaded through clamp 33. Two knobs 39, 40, provided with a planetary gear arrangement such as is commonly used for tuning radio sets, are mounted on one end of the shaft so that by turning one of the knobs the lamp may be moved rapidly horizontally and by turning the other knob a fine adjustment of the lamp is obtained.

The two-phase reversible motor 15 (see Figure 2) is mounted on box 26 and drives rotary shutter 16 through gear reducer 41, shaft 42, and friction slip clutch 43. The periphery of the shutter (see Figure 4) is of spiral shape except for notch 44. A circular support 45 (Figures 2 and 4) is secured to the side of shutter 16 and carries two circular potentiometers 47, 48 energized by a source of electrical energy, not shown in Figures 1-7. Two similar spring electrical contacts 49 are carried by insulating support 50 mounted on angle iron 51 which is secured to box 25 and extends behind the fluid channels 2 and 3 to a position adjacent the rotary shutter, as shown in Figures 2 and 4. The two spring contacts ride on and make electrical contact with potentiometers 47, 48, respectively. Reference numeral 52 designates two projections on the shutter 16 for operating limit switch 53 to break the circuit of motor 15 when the shutter rotates a predetermined amount in either direction.

The construction of the manually adjustable shutters 13 is shown in more detail in Figures 3 and 5. As illustrated in these figures, these shutters are slidably mounted between guide plates 54 and box 25, and are provided with nuts 55 oppositely threaded on different portions of threaded bolt 56 rotatably mounted in brackets 57. By turning the bolt by knob 58, shutters 13 may be manually moved toward and away from each other so as to adjust the size of the aperture through which light passing through the fluid channel 3 is transmitted to photoelectric cell 7. 59 is a set screw for holding shutters 13 in adjusted position and 60 is a plate secured to the inside of box 25, the lower edge of which defines the upper edge of the light path into the box.

Shutters 14 are illustrated in detail in Figures 2, 3, 4 and 7. As shown in these figures, the shutters 14 are slidably mounted between the box 26 and guide plates 62 secured thereto. The inner ends of the shutters abut stops 64 (see Figure 7) secured to box 26 and are held in this position by spring clips 65 secured to the front and rear, respectively, of the box, which springs bear against the outer portions of the shutters as shown in Figure 3. The space between the inner ends of these shutters forms an aperture through which light passing through the windows of the fluid channel 2 is transmitted to photoelectric cell 6. The size of this aperture may be varied by employing stops of different sizes.

Thus it will be seen that light source 1, photoelectric cells 6, 7, motor 15, and shutters 13, 14 and 16 are all mounted on unitary supporting frame 24. This frame is slidable along guides 66 secured to base plate 21 toward the rear of the base plate to permit ready access to fluid channel windows 5. The frame is accurately secured in the operative position shown on the drawing by tapered locating pins 67 (see Figures 2–5) extending through apertures in members 68 secured to boxes 25 and 26 and cooperating apertures 69 in the base plate. Accurate vertical positioning of the frame is accomplished (see Figure 3) by tapered locating pins 70 secured to members 36, which pins extend horizontally through apertures in elements 72 secured to the rear parallel member 20 at the level of windows 5. Similar pins (not shown) may be secured to boxes 25 and 26 and extend through apertures in members similar to 72 attached to the front member 20 at the level of windows 5. This construction permits repeated removal and accurate replacement of the frame 24 and the photoelectric cells, light source and shutters carried by the frame in the same position with respect to windows 5. By constructing support 19 of material of substantially the same coefficient of thermal expansion as boxes 25 and 26, the alignment of the photoelectric cells, windows 5 and the light source is not substantially affected by temperature changes.

The analyzer involves an electrical arrangement which functions to rotate motor 15 and shutter 16 in the direction to reduce the amount of light reaching photo cell 6 when this cell receives more light than cell 7 and in opposite direction to increase the amount of light falling on cell 6 when this cell receives less light than cell 7 and to de-energize the motor when both cells receive the same amount of light. Thus it is evident that each position of the shutter corresponds to a definite concentration of naphthalene in the fluid flowing through channels 2, 3 and that by recording movement of the shutter on an appropriately calibrated scale a record of the naphthalene content of the fluid is obtained. Since the naphthalene concentration of the fluid flowing through the vapor channels is a logarithmic function of the difference in the intensity of light transmitted through the two channels, it is preferred that the spiral portion of the periphery of shutter 16 be designed as an appropriate logarithmic spiral so that the naphthalene concentration may be recorded as a linear function of the shutter movement. Rotation of the shutter varies the electrical potential impressed on contacts 49 which ride on potentiometers 47 and 48 carried by shutter 16. Variations in the potential on one contact 49 control the operation of a recorder calibrated, say, in terms of mol per cent of naphthalene. Variations in the potential impressed on the other contact 49 control the operation of a proportioning device which controls the amount of naphthalene admixed with the air and thus maintains the naphthalene content of the mixture flowing through the fluid channels 2, 3 at a predetermined value.

The electric circuits for effecting operation of the apparatus in the above manner are shown in Figure 8 which is a simplified diagram illustrating the principle of important electrical connections employed in the analyzer, and in Figure 9 which shows the circuits in more detail. Referring first more particularly to Figure 8, reference numerals 90 and 91 designate two electron vacuum tubes connected as an oscillator to generate alternating current of the desired frequency, say, 10 cycles per second, which frequency may be adjusted by adjustment of potentiometer 92. This current is amplified in electron tube amplifier 93 and the amplified current energizes ultraviolet lamp 1 so that it emits pulsating ultraviolet light of the desired wave length at the rate of 10 pulsations per second. Lamp 1 directs pulsating beams of the ultraviolet light through windows 5 of vapor channels 2, 3 and through the streams of naphthalene vapor-air mixture of different thickness onto photoelectric cells 6 and 7.

The photoelectric cells are in a circuit involving two sources of substantially constant voltage such as batteries 94 and 95 connected, respectively, to the cathode of cell 6 and the anode of cell 7, a conductor 96 connecting the anode of cell 6 with the cathode of cell 7 and a high resistance 97 (e. g., 1000 megohms) through which the photo cell currents tend to flow in opposite directions. The portions of the photo cell circuit indicated by dash lines between solid lines in Figure 8 should be very carefully insulated because the photo cell currents are small. For example, the conductor connecting the two cells may be enclosed in a quartz tube within a steel tube and the upper portions of the cells coated with wax. Boxes 25, 26 shield portions of the photoelectric cell circuits from electrostatic and electromagnetic interference. The resistance 97 is electrically connected to the grid of electronic amplifying tube 98, the upper portion of which may be coated with wax. This tube amplifies the voltage drop across the resistance and the voltage is subjected to six additional stages 99–104 of resistance-coupled electronic amplification tuned to the frequency of the lamp energizing current. By utilizing light pulsations of given frequency and an amplifying circuit tuned to this frequency, slow and erratic variations in current in the photoelectric cell circuit are not amplified and hence do not affect the accuracy of the analysis. It is preferable to employ light pulsations of a frequency different from that of alternating current utilized to operate nearby equipment to avoid inaccuracies due to interference by stray electrostatic and electromagnetic fields.

The amplified alternating voltage is fed to electronic phase inverter tube 105 which operates in a conventional manner so that the voltages on the conductors 106, 107 from this tube are 180° out-of-phase with each other. Thus the voltage impressed by tube 105 on one of conductors 106, 107 is in phase with the voltage on resistance 97 and the voltage on the other conductors is out-of-phase with the voltage on resistance 97. The oscillator voltage is also impressed directly on conductors 106 and 107 through conductor 108 and resistances 108'. Assume that photoelectric cell 6 receives more light than cell 7 and that under these conditions the oscillator voltage through resistances 108' is in phase with the voltage impressed by phase inverter 105 on conductor 106 and out-of-phase with the voltage impressed by the phase inverter on conductor 107. The oscillator voltage will then be added to the voltage on conductor 106 to energize the grid of rectifier tube 109 and subtracted from the voltage on conductor 107 so that rectifier tube 110 is not energized. Energization of the rectifier tube 109 reduces the negative voltage on the grid of thyratron relay tube 111 causing this tube to act as a conductor and establish a circuit through winding 112 of motor 15 to rotate the motor and shutter 16 in the direction to reduce the amount of light to photoelectric cell 6. When the shutter has rotated sufficiently to equalize the amounts of light received by the two photoelectric cells the currents tending to flow through resistance 97 balance each other so that there is no 10-cycle voltage drop across the resistance with the result that the amplifying circuit, phase inverter 105 and rectifier 109 become inoperative and thyratron tube 111 ceases to function as a relay thus breaking the motor circuit.

When photoelectric cell 7 receives more light than cell 6, a 10-cycle voltage drop is established across resistance 97, which voltage is out-of-phase with the voltage across the resistance when cell 6 receives more light, and the phase relationship of the amplified voltage on the conductors 106, 107 from phase inverter 105 with respect to the oscillator voltage is reversed, i. e., the oscillator voltage is then in phase with the voltage on conductor 107 and out-of-phase with the voltage on conductor 106 with the result that the grid of rectifier tube 110 is energized and the negative voltage on the grid of thyratron relay tube 114 is reduced. This causes tube 114 to become conducting and establish a circuit through winding 113 of motor 15 to rotate the motor and shutter 16 in the direction to increase the amount of light received by photoelectric cell 6 until the amounts of light received by the cells are equalized. When this condition occurs, the 10-cycle voltage drop across resistance 97 ceases, the amplifying circuit and phase inverter and rectifying tube 110 become inoperative and break the motor circuit. The motor then remains stationary until, owing to change in the composition of the naphthalene vapor-air mixture passing through the fluid channels 2, 3, one of the photoelectric cells receives more light than the other at which time the above operation is repeated.

Potentiometer 47 carried by shutter 16 is connected to potentiometer 115 of a recorder by conductors 116, 117 and a suitable source of voltage 118 is connected across the potentiometers. The recorder may be any conventional recording instrument controlled by variations in electrical potential such as the recorder sold by Leeds & Northrup Company under the name Micromax recorder. Variation in the naphthalene content of the fluid flowing through channels 2, 3 causes corresponding movement of shutter 16 and potentiometer 47 so that current flows through galvanometer 119. The recorder then operates to move contact arm 119' to a position such that no current flows through the galvanometer and moves the recorder pen correspondingly. By recording movement of the recorder pen on a suitably calibrated scale a continuous record of the naphthalene content of the fluid is obtained.

In operation of the apparatus, it is desirable to avoid too great fluctuation of the voltage impressed on the amplifying circuit due to fluctuations in the magnitude of the photoelectric cell currents arising from variations in the amount of light falling on the cells when the naphthalene content of the fluid varies relatively widely. For this purpose, the electrical contact arm 49 riding on potentiometer 47 is electrically connected by conductor 120 to a grid of amplifying tube 99 in such manner that the negative voltage impressed on this grid is varied so as to increase and decrease the amplifying action of the tube as the naphthalene content of the fluid increases and decreases respectively. This arrangement compensates for variations in the magnitude of the photoelectric cell currents owing to variations in the amount of light absorbed by fluid containing different concentrations of naphthalene without adversely affecting the sensitivity of the apparatus to change in naphthalene concentration.

Reference numeral 121 designates the potentiometer of any suitable automatic proportioning device, which potentiometer is connected by conductors 121' to potentiometer 48 carried by shutter 16. A suitable source of voltage 122 is connected across the potentiometers. The proportioning device may involve, for example, a polarized relay 122' connected to potentiometer 121 by conductor 123 and to potentiometer 48 by conductor 123' and the contact 49 riding on this potentiometer in such manner that when the shutter 16 is in a predetermined position no current flows through the relay, but when the shutter moves in one direction or the other as the naphthalene content of the fluid varies, current flows in one direction or the other through the relay and operates the motor of an automatic valve mechanism controlling the amount of naphthalene vapor mixed with the air in the direction to increase the naphthalene content of the fluid when it falls below a predetermined amount and to decrease the naphthalene content when it rises above a predetermined amount. The proportioning device may be an automatic valve sold by Automatic Temperature Control Co. under the name Relatrol type 3D so as to increase or decrease the naphthalene content of the fluid when it varies from a predetermined value.

For accurate recording, it is important that under predetermined conditions the currents through the photoelectric cells balance each other so that no 10-cycle current flows through resistance 97. For the purpose of determining whether the photoelectric cells are in balance under predetermined conditions, there is provided a test microammeter 124 electrically connected to the cathodes of vacuum electron tubes 125 and 126 in such manner that when the grids of both tubes are equally energized the microammeter registers zero and when the grids are unequally energized the microammeter pointer swings to the right or left, depending on which grid is more highly energized. The grids of the tubes 125, 126 are electrically connected by conductors 127 and 128 and plug and jack 128' to the output conductors of rectifier tubes 109 and 110, respectively. When the photoelectric cells receive equal amounts of light with the result that no 10-cycle current flows through resistance 97, the grids of rectifier tubes 109 and 110 are equally energized and hence the grids of tubes 125 and 126 are equally energized so that the indicator pointer of the microammeter registers zero, but when either photoelectric cell receives more light than the other, the grid of one of tubes 125, 126 becomes more highly energized than the other with the result that the pointer of the microammeter is deflected from zero position.

Figure 9 shows in more detail the electrical circuits of the analyzer. In this figure reference numeral 131 designates a source of 110 volt, 60-cycle alternating current and reference numerals 132, 133, 134 and 135 are power packs for supplying unidirectional voltages such as are frequently employed for this purpose in radio receivers. The power packs involve transformers 137, rectifying tubes 138 and 139, filter chokes 140 and filtering condensers 141. The filaments X—X and Y—Y, Z—Z of the various tubes are energized from the transformer secondary windings bearing the corresponding reference letters and the cathode Z' of tube 93 is connected to the center tap of secondary transformer winding Z'. Tube 99 may be of the type known commercially as 6L7. Each pair of tubes 100 and 101, 102 and 103, 104 and 105, and 109 and 110 may be double tubes in a single envelope known commercially as 6SL7GT, thyratron tubes 111 and 114 may be of the type 2050, tubes 125 and 126 may be a double tube in a single envelope of the type 6SN7GT, tube 90 may be of the type 6SJ7, tube 91 of the type 6F6, tube 93 of the type 807, tubes 138 of the type 5Y3G, and tubes 139 of the type 5Y4G.

Tube 98 should be sensitive to small currents. This tube may be of the type commercially known as No. 38 and is preferably operated at low filament and plate voltage, e. g., at a filament voltage of about 4 volts supplied through resistances 143 and at a plate voltage of 37.5 from battery 144. Battery 144 may also be utilized to impress 9 volts on a grid of tube 98 and 10.5 volts on two grids of tube 99, as indicated in Figure 9.

It is desirable to vary the amplification of the voltage drop through resistance 97 in order to compensate for factors such as film formation on windows 5. For this purpose an amplifier control or attenuator is located between amplifying tubes 100 and 101. The amplifier control may be adjusted to increase or decrease the amplification by manually moving contact 146 connected to the grid of tube 101 stepwise along the series resistances 147 of the control.

The oscillator is of conventional feed-back type, as illustrated diagrammatically in Figure 9, for converting rectified current from power pack 135 to alternating current of the desired frequency.

Various resistances and condensers shown in the oscillator and amplifying circuits operate in a well known manner for tuning purposes and require no further description. Filtering condensers are also shown in the conductors 106, 107, the circuit of rectifying tubes 109, 110 and the circuit of microammeter 124.

The ultraviolet lamp 1 illustrated in the drawing is of the type in which a filament at the cathode is heated to supply electrons for starting ionization and the mercury vapor is ionized to emit ultraviolet radiation. Reference numeral 149 designates a switch for reversing the polarity of the lamp from time to time to increase its life; the cathode filaments A—A and B—B are heated by current from transformer 150 connected by reversing switch 151 to energize either filament of the lamp, depending on which filament is at the cathode. In order to avoid undue deterioration of the lamp, a direct current component is preferably added to the lamp-energizing alternating current from the oscillator of a voltage somewhat greater than the negative halves of the alternating current cycles to avoid extinguishment of the lamp during each cycle. For this purpose direct current of suitable voltage is supplied from power pack 135 through conductor 153, resistance 154 and adjustable potentiometers 155 and 156 to the grid of amplifying tube 93. Potentiometer 156 may be utilized to vary the magnitude of the lamp-energizing current while maintaining the desired ratio of the alternating and direct components of the current.

The motor circuit involves transformer 158 to isolate the motor from the grounded A. C. line. The primary winding M—M of the transformer is energized from the secondary transformer winding M—M. Switch 160 may be employed for manually breaking the motor circuit. The circuits through motor windings 112, 113 include thyratron tubes 111 and 114, respectively, and 161 is a choke coil between the motor windings to reduce hunting of the motor.

Various signals or alarms may be incorporated in the motor, oscillator, lamp and amplifying circuits. For example, when switch 53 is actuated by either of projections 52 on shutter 16 to break the motor circuit it simultaneously closes the circuit through neon lamp 162 on the operator's control board, and thus gives a signal that the motor and shutter will no longer rotate in response to changes in the naphthalene content of the fluid passing through the vapor cells. A neon lamp may be energized from the circuit of lamp 1 to indicate when this circuit fails.

In analyzing mixtures such as naphthalene vapor-air mixtures which form film on windows 5 under the influence of the light employed, it is important that light source 1 be so adjusted that equal film formation occurs in the two fluid channels. In order to accomplish this, motor switch 160 is opened, locating pins 67 are removed, the unitary support 24 is moved rearwardly on base plate 21, holders 8 and windows 5 are removed, cleaned carefully, e. g. with benzene, and accurately replaced in the fluid channels 2, 3 and the support 24 and locating pins are then replaced to the position shown on the drawing. Shutter 16 is turned so that notch 44 is aligned with windows 5 and the shutter does not obstruct passage of light from the lamp 1 to photoelectric cell 6. Friction slip clutch 43 permits the shutter to be turned without turning motor 14 and also prevents rotation of the motor too far in either direction from damaging the electrical connections to potentiometers 47, 48. Shutters 14 are removed, amplifier control 146 is adjusted to a position of low amplification and microammeter 124 is electrically connected with the output conductors of rectifier tubes 109, 110 by plug and jack 128'.

Air is passed through the fluid channels 2, 3 and the shutters 13 are adjusted by turning knob 58 until microammeter 124 registers zero, indicating that the photoelectric cells 6, 7 are receiving equal amounts of light from lamp 1. Passage of air through the fluid channels is discontinued and naphthalene vapor-air mixture is passed through the channels for some time, say, half an hour, and passage of air alone through the channels is then resumed. If equal amounts of film were deposited on the windows 5 of the two fluid channels 2, 3 during passage of naphthalene, microammeter 124 will register zero when passage of air is resumed, but unequal film formation causes deflection of the microammeter pointer to the right or left, depending on whether the film deposit is greater in one fluid channel or the other. Lamp 1 is adjusted by turning knobs 39, 40 away from the fluid channel in which the film formation is greatest and the apparatus rechecked, as hereinabove described, until the position of the lamp is such that equal film is formed in both channels. Set screws 37 are tightened to hold the lamp in adjusted position. Shutters 14 are then replaced, shutter 16 is turned so that the notch 44 is out of line with the light path to photoelectric cell 6, and the microammeter 124 is disconnected from the rectifying tubes. The naphthalene vapor-air mixture to be analyzed, which may contain steam used in vaporizing the naphthalene, is passed through the fluid channels, motor switch 160 is closed, and amplifier control 146 is turned up sufficiently to afford suitable amplification of the voltage drop across resistance 97 but not enough to cause motor 15 to hunt objectionably. Shutter 16 will then be automatically rotated to the position corresponding to the naphthalene content of the mixture and the recorder and proportioning device automatically record and maintain the concentration of the naphthalene at a predetermined value.

As the analysis proceeds, film resulting from the photochemical action of the ultraviolet light on the naphthalene vapor is gradually deposited on the inner surfaces of windows 5. However, since lamp 1 is adjusted so that film formation in the two fluid channels 2, 3 is equal, the films counterbalance each other and do not introduce error into the analysis. Nevertheless, excessive film formation is objectionable and for this reason it is preferable to maintain the fluid velocity in the channels relatively high to minimize the period of exposure of the vapor to the light, and thus minimize film formation. For example, maintenance of a fluid velocity sufficiently high that the naphthalene is not exposed to the ultraviolet light more than 0.1 second retards formation of excessive film. As the film increases it is desirable to increase the amplification from time to time by adjusting amplifier control 146 to maintain the sensitivity of the analyzer to small changes in naphthalene concentration notwithstanding reduction of the amount of light transmitted to the photoelectric cells owing to the film. The design of the inner surfaces of the fluid channels to promote stream-line flow avoids uneven film formation on the windows 5 which might otherwise result from eddy currents in the fluid. Steam jackets 4 maintain the fluid at constant temperature, say, 100° C., thus contributing to the accuracy of the analysis.

While it may be necessary to adjust lamp 1 only once during its life, it is desirable to clean windows 5 from time to time to remove film and other foreign matter, say, at intervals of from 24 to 72 hours. This may be accomplished as hereinabove described by opening motor switch 160, removing frame 24, holders 8, and after cleaning the windows with benzene, replacing them and replacing the frame. After each cleaning the apparatus should be adjusted by turning the rotating shutter so its notch 44 permits unobstructed passage of light to photoelectric cell 6, removing shutters 14, turning amplifier control 146 to low position, plugging in microammeter 124 by plug and jack 128', passing air through the fluid channels and adjusting shutters 13 so that the microammeter reads zero. Shutters 14 are then replaced, and shutter 16 turned so that a portion of its spiral periphery falls in the light path to photoelectric cell 6. The mixture to be analyzed is then passed through the fluid channels and motor switch 160 is closed.

Figure 10:
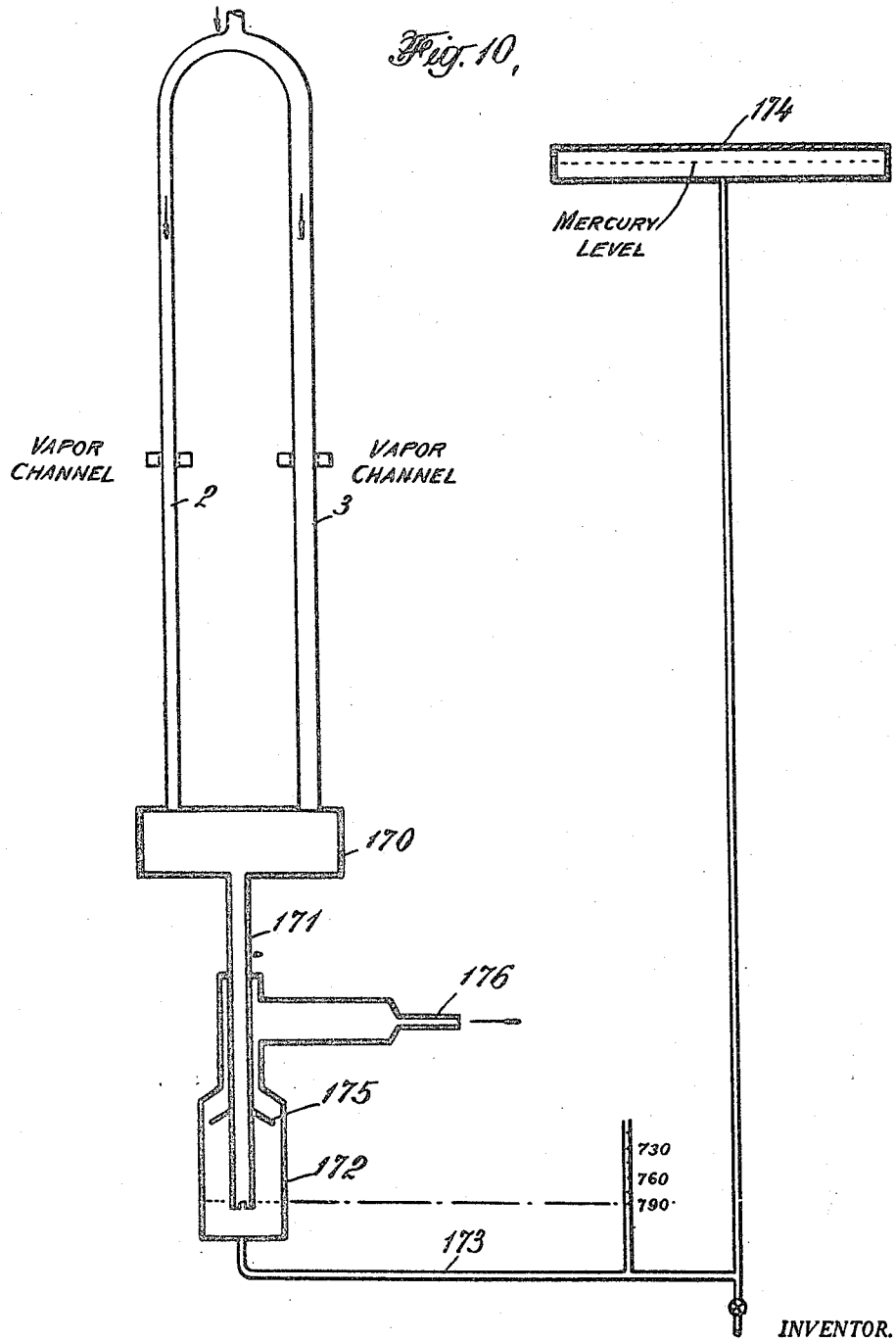
Figure 10 is a diagrammatic view illustrating one arrangement for maintaining constant pressure in the fluid channels.

In order to promote accurate analysis of vapor mixtures, it is desirable that the pressure on the fluid flowing through channels 2, 3 should be maintained substantially constant. An arrangement for accomplishing this is shown in Figure 10. As shown in this figure, fluid channels 2, 3 discharge into manifold 170, which in turn discharges through pipe 171 having a slotted lower end extending into a pool of mercury in chamber 172. The chamber is connected by pipe 173 to a reservoir 174 containing mercury under vacuum located at such height that the desired pressure, e. g., 790 mm. of mercury, is imposed on the vapor. The level of mercury in chamber 172 automatically rises and falls to compensate for variations in atmospheric pressure. The vapor, after bubbling through the mercury in chamber 172, passes over baffles 175 which remove entrained mercury droplets, and then through outlet 176 for disposal in any desired manner. The analysis of naphthalene vapor-air mixtures ordinarily requires such a small amount of naphthalene that it is usually not worthwhile to conserve the naphthalene passed through the analyzer. Other types of pressure regulators may also be employed; for example, electrical contacts sealed in a mercury barometer tube at appropriate points may be used to open and close a motor circuit controlling a valve in pipe 171 so as to maintain substantially constant pressure in the fluid channels. Obviously, the pressure regulator may be omitted and corrections made for variations in atmospheric pressure.

Figure 11:
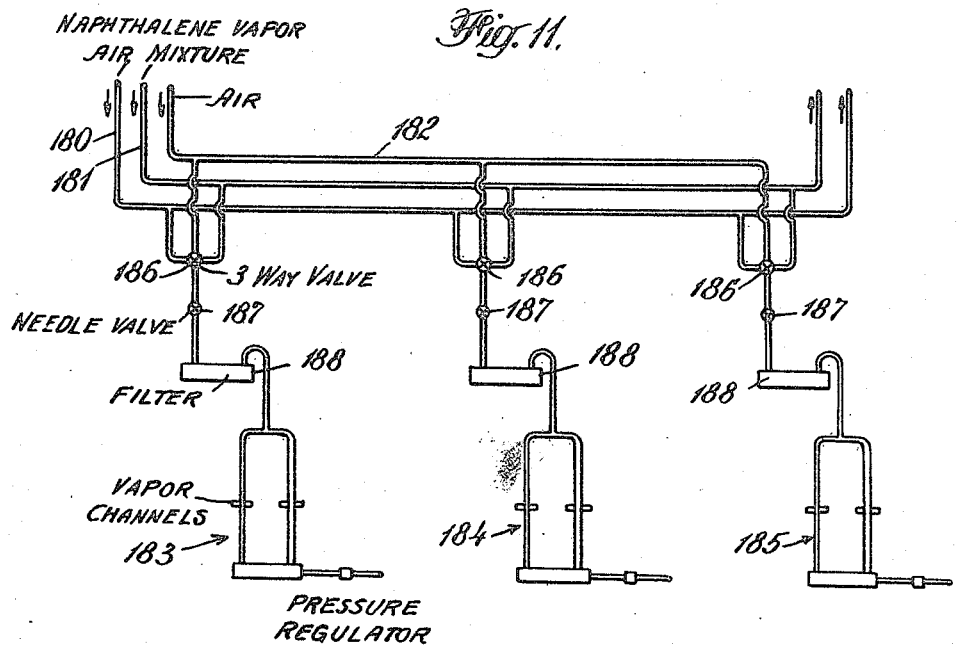
Figure 11 illustrates a method of connecting analyzers of the invention to mains conducting fluid to be analyzed.

Figure 11 illustrates an arrangement for connecting three of the analyzers to mains supplying naphthalene vapor-air mixtures to two phthalic anhydride converters so that when any of the analyzers require repair or adjustment another can be substituted for it immediately. In Figure 11 reference numerals 180 and 181 designate two conduits connected respectively to mains supplying naphthalene vapor-air mixtures to two converters and 182 is a conduit for supplying air for adjusting the analyzers, as hereinabove described. Each of three analyzers designated generally by reference numerals 183, 184 and 185 are connected to conduits 180, 181 and 182 by conduits, as shown, equipped with three-way valves 186 and needle valves 187 so that naphthalene vapor-air mixtures from either conduit 180 or 181 or air from conduit 182 may be passed through any of the analyzers at a rate determined by adjustment of the needle valves. Filters 188 containing glass wool may be installed in conduits conducting naphthalene vapor to the respective analyzers to remove impurities, such as tarry matter, and absorbent cotton filters may be installed in air conduit 182 to remove oil droplets which might affect the accuracy of the analysis. A recorder may be permanently associated with each converter and any of the analyzers electrically connected with either of the recorders by plugs and jacks on a control board.

Figure 12:
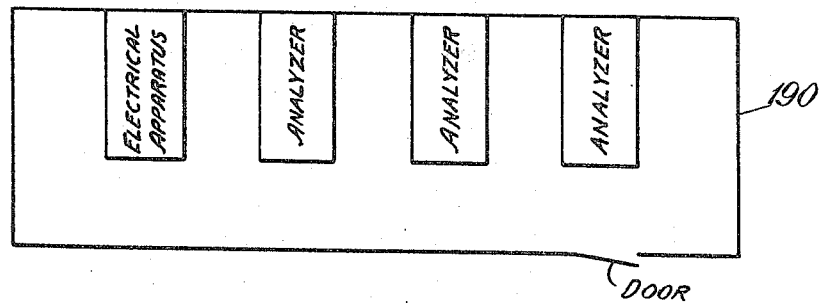
Figure 12 is a diagram of a floor plan for a plurality of analyzers.

For plant operation where the atmosphere contains dust or chemicals, one or more of the analyzers may advantageously be placed in a closed metal room designated by reference numeral 190 (see Figure 12) and clean dry air continuously blown through the room. The openings in boxes 25, 26, through which light enters to the photoelectric cells, may be closed by quartz or other light-transmissive windows to prevent entry of foreign material into the boxes.

It will be observed that aside from the conventional recording and proportioning devices the only moving parts of the analyzer which operate while making an analysis are the motor 15, shutter 16 and the connections therebetween. The tubes and electric circuits may be mounted in a simple manner on a panel similar to a radio chassis. Hence the analyzer is highly compact and minimizes inaccuracies due to mechanical wear and tear.

The invention is adapted for analyzing fluids in either the liquid or vapor phase. For example, it may be utilized for analyzing liquid mixtures of benzene and cyclohexane, employing ultraviolet light of appropriate wave length. Of course, light of wave length such that it is more strongly absorbed by one constituent than another constituent of the mixture should be employed. In making liquid phase analyses the windows 5 of each fluid channel are usually closer together than for vapor phase analyses. The invention is applicable to the detection of small amounts of impurities in materials as well as to the analyses of mixtures. Usually the space between the windows of each fluid channel is greater for the detection of small amounts of light-absorbing impurities than for analyses of mixtures containing substantial amounts of light-absorbing materials. Owing to the fact that the fluid channel windows 5 may be constructed so they have the same optical properties and hence optically counterbalance each other, the analyzer may also be employed for determining the light-absorbing and transmitting properties of various pure materials and mixtures where it is not desired to analyze the materials.

It is obvious that various modifications of the analyzer may be resorted to. For example, the recorder may be omitted and the analyzer used as an indicating instrument by reading the position of shutter 16 on an appropriately calibrated scale. If desired, the microammeter may be permanently connected by plug and jack 128' to the rectifying tubes and shutter 16 manually operated by an appropriately calibrated micrometer. The micrometer reading then provides an indication of the analysis of the fluid in channels 2, 3 when the microammeter reads zero. As a further modification, instead of operating the analyzer as a null-point instrument, microammeter 124 may directly indicate the composition of the fluid under investigation on a suitably calibrated scale; in this modification, rotary shutter 16 may either be omitted or maintained in a fixed position during any given analyzing operation; while this simplifies the construction of the analyzer and may be suitable for certain purposes, it lacks the advantages of a null-point measuring device. Shutters 14 may be omitted and the design of light transmitting opening into box 25 and shutter 16 coordinated to provide accurate analysis. While I have described the use of photoelectric cells of the photo-emissive type, other types of light-sensitive devices of suitable sensitivity such as photoelectric cells of the photovoltaic type may be employed in some cases. The voltage supplied by various batteries such as batteries 94, 95 may be supplied instead from power packs through improved filters which smooth out ripples in the current. Where the fluid to be tested is of a character such that visible light may be utilized, it is preferred to employ as the light source a lamp of the gaseous discharge type. If desired, commercial light filters may be used to restrict the wave lengths to a particular band.

Since certain changes may be made without departing from the scope of the invention, it is intended that the above shall be interpreted as illustrative and not in a limiting sense.

I claim:

1. Apparatus for continuously testing fluids containing a plurality of components, said fluids being subject to variation in composition, comprising in combination a source of light of wave length such that different amounts of the light are absorbed by streams of the fluid of different thickness, a source of fluid to be tested, two fluid channels of different thickness having wall portions transmissive of said light, means for simultaneously and continuously passing two streams of the fluid to be tested from said source of fluid through the respective channels, said streams of fluid being of substantially the same composition, two devices sensitive to light of said wave length, said light source, said transmissive wall portions and said light-sensitive devices being located so that light passes substantially continuously from said source through one of said channels to one of said light-sensitive devices and simultaneously passes substantially continuously from said light source through the other of said channels to the other of said light-sensitive devices, and an electric circuit connecting said light-sensitive devices in opposition, said circuit involving a portion through which current from one light-sensitive device tends to flow in one direction and current from the other light-sensitive device tends to flow in the opposite direction, whereby the electrical condition of said circuit is a function of the capacity of said fluid to absorb said light.

2. Apparatus as specified in claim 1 comprising a substantially opaque shutter movable to increase and decrease the amount of light passing from the thinner fluid channel to its associated light-sensitive device and electroresponsive means operated in response to flow of current in said circuit portion for indicating when the amount of light received by one light-sensitive device bears a predetermined ratio to the amount of light received by the other light-sensitive device.

3. Apparatus for analyzing fluids containing at least one constituent which absorbs light of given wave length and at least one other constituent substantially transparent to light of said wave length, comprising in combination two fluid channels of different thickness having wall portions transmissive of light of said wave length, a source of light of said wave length positioned to direct beams of light through said wall portions of said channels, two photoelectric cells positioned to receive light transmitted through said respective channels, means for passing streams of said fluid through said channels, whereby the amounts of light absorbed in the respective channels and the amounts of light transmitted to the respective photoelectric cells vary in accordance with variations in the concentration of light-absorbing constituent of said fluid, an electric circuit connecting said photoelectric cells in opposition, said circuit including a portion through which current flows in one direction when the amount of light received by one cell bears more than a given ratio to the amount of light received by the other cell and in the other direction when the amount of light received by the said one cell bears less than said given ratio to the amount of light received by the other cell, a shutter operable to intercept varying amounts of light passing from the thinner fluid channel to its respective photoelectric cell, and means operated in response to flow of current in the respective directions through said portion of said electric circuit to operate the shutter to restore the ratio between the amounts of light received by the photoelectric cells to said given ratio.

4. A process of analyzing fluids subject to variation in composition and containing constituents of different absorbing capacity for light of given wave length, at least one of said constituents being reactive to deposit light-absorbing film when subjected to the influence of said light, which process comprises maintaining two continuously flowing streams of said fluid of different thickness through chambers having walls transmissive of said light in contact with said streams, passing two beams of light of said wave length through the chamber walls and the respective streams, said beams being of such relative intensity that substantially equal films are deposited from said streams on said walls under the influence of light, creating an electrical condition which is a function of the relative amounts of light transmitted through said streams and indicating said electrical condition.

5. Apparatus for analyzing fluids containing at least one constituent which absorbs light of given wave length and at least one other constituent substantially transparent to light of said wave length, comprising in combination a source of light of said wave length, means for energizing said light source to emit pulsations of said light at a predetermined frequency, two fluid channels of different thickness, each having wall portions transmissive of said light, means for continuously passing streams of fluid through said channels, two photoelectric cells positioned to receive light transmitted from said source through said respective fluid channels, an electric circuit connecting said photoelectric cells in opposition, said circuit including a portion through which currents from said respective photoelectric cells tend to flow in opposite directions at any given instant, whereby current having an alternating current component of a frequency corresponding to said light pulsations flows in one direction through said circuit portion when one photoelectric cell receives more light than the other and in the other direction through said circuit portion when the other photoelectric cell receives more light, so that the current through said circuit portion, when one cell receives more light, is 180° out-of-phase with the current flowing through said portion when the other cell receives more light, the currents balancing each other so that no current of said frequency flows through said circuit portion when both cells receive the same amount of light, a shutter operable to intercept varying amounts of light passing from the thinner fluid channel to its respective photoelectric cell, amplifying means tuned to the frequency of said light pulsations for amplifying the voltage drop across said circuit portion, and means responsive to differences in the phase of the amplified voltage for operating the shutter to equalize the amounts of light received by the two photoelectric cells.

6. Apparatus for analyzing fluid mixtures containing naphthalene and oxygen and which may contain other constituents substantially transparent to ultraviolet light of wave length absorbed by naphthalene, said apparatus comprising in combination two fluid channels of different thickness, each having wall portions transmissive of light of said wave length, means for continuously passing streams of said naphthalene vapor-containing mixture through said channels, a source of light of said wave length located between the wall portions of said respective channels, means for adjusting the position of said light source so that equal films are formed on the wall portions of the respective channels by the action of said light on said naphthalene, means for energizing said light source to emit pulsations of light at a given frequency, two photoelectric cells positioned to receive light transmitted from said source through said wall portions and the fluid streams flowing through said fluid channels, an electric circuit connecting said photoelectric cells in opposition, said circuit including a resistance through which currents from said respective photoelectric cells tend to flow in opposition, whereby the current flowing through said resistance, when one cell receives more light than the other, is approximately 180° out-of-phase with the current flowing through said resistance when the other cell receives more light, electronic amplifying means amplifying the voltage drop across said resistance, said electronic amplifying means being tuned so that it amplifies substantially only voltage of the frequency of said light pulsations, a shutter rotatable to intercept varying amounts of the light transmitted through the thinner fluid channel before passing to its associated photoelectric cell, an electric motor for rotating said shutter in either direction, and means responsive to differences in phase of said amplified voltage for completing a circuit to operate the motor and rotate the shutter to equalize the amounts of light received by said photoelectric cells when they receive unequal amounts of light.

7. Apparatus as specified in claim 6 in which said means responsive to differences in phase comprises a phase inverter, two output conductors from said phase inverter through one of which the amplified voltage is in phase with the voltage on said resistance and through the other of which the amplified voltage is approximately 180° out-of-phase with the voltage on said resistance, means for impressing on said conductors voltage bearing a constant phase relationship to said light pulsations, whereby said last named voltage is in phase with the amplified voltage on one of said conductors when one of said photoelectric cells receives more light than the other and is in phase with the voltage on the other of said conductors when the other photoelectric cell receives more light, two rectifying tubes having grids connected to said respective conductors, two relays electrically connected in the output circuits of the respective rectifying tubes, one of said relays being energized to establish a circuit through said motor to operate it in one direction when one of said photoelectric cells receives more light than the other, and the other relay being energized to establish a circuit to rotate the motor in the other direction when the other cell receives more light.

8. Apparatus as specified in claim 6 in which the light-energizing means comprises an oscillator for supplying current of the desired frequency and in which the last named means of claim 6 comprises a phase inverter for the amplified voltage including two output conductors from said phase inverter, in one of which the amplified voltage is in phase with the voltage through the resistance and in the other of which the amplified voltage is out-of-phase with the voltage through said resistance, means for impressing voltage from said oscillator on said conductors, whereby the oscillator voltage is in phase with the voltage on one conductor when one photoelectric cell receives more light than the other and is in phase with the voltage on the other conductor when the other photoelectric cell receives more light, two electronic rectifying tubes having grids electrically connected to said respective conductors, two thyratron relay tubes having grids electrically connected to said respective rectifying tubes, whereby one of said rectifying tubes and its associated relay tube is energized to establish a circuit through the motor to operate it in one direction when one photoelectric cell receives more light than the other and the other rectifying tube and its associated relay tube is energized to establish a circuit through the motor to operate it in the other direction when the other photoelectric cell receives more light.

9. Apparatus for the analysis of fluids comprising in combination a base, two fluid channels having light-transmissive wall portions supported on said base, a unitary support for supporting a source of light between said fluid channels and two photoelectric cells exteriorly of the space between said fluid channels in position to receive light transmitted from said light source through said fluid channels, said supporting means for said light source and photoelectric cells being movable as a unit to permit access to said wall portions, and locating means for accurately positioning said unitary support with respect to said light-transmissive wall portions.

10. A fluid analyzer comprising in combination a horizontal base, fluid channels of unequal thickness surrounded by heating jackets extending at an angle to said base, two light-transmissive wall portions in each of said fluid channels, fluid channel supporting means secured to said base and secured to said channels at approximately the level of said wall portions, a removable unitary support for supporting a light source between said fluid channels and two photoelectric cells exteriorly of the space between said channels in position to receive light transmitted from said source through said wall portions of the respective channels, said unitary support comprising enclosures for the photoelectric cells, a rotary shutter mounted on one of said enclosures and extending downwardly into the light path from the thinner fluid channel to one of the photoelectric cells, and manually adjustable shutter means between said wall portions of the thicker fluid channel and the photoelectric cell receiving light transmitted therethrough, said enclosures, rotary shutter and fluid channel supporting means being of approximately the same coefficient of thermal expansion.

11. A process as defined in claim 4 in which pulsating beams of light are passed through the chamber walls and the respective streams.

12. A process as defined in claim 4 comprising photoelectrically controlling said electrical condition in response to variation in the amounts of light transmitted through said streams of fluid and controlling an indicator for the proportions in which at least one of said constituents is present in the fluid in response to variations in said electrical condition.

13. Apparatus for testing fluids comprising in combination a source of light of wave length such that different amounts of the light are absorbed by streams of the fluid of different thickness, two fluid channels of different thickness having wall portions transmissive of said light, means for passing two streams of the fluid to be tested through the respective channels, said streams of fluid being of substantially the same composition, two devices sensitive to light of said wave length, said light source, said transmissive wall portions and said light-sensitive devices being located so that light passes from said source through one of said channels to one of said light-sensitive devices and simultaneously passes from said source through the other of said channels to the other of said light-sensitive devices, an electric circuit connecting said light-sensitive devices in opposition, said circuit involving a portion through which current from one light-sensitive device tends to flow in one direction and current from the other light-sensitive device tends to flow in the opposite direction, whereby the electrical condition of said circuit is a function of the capacity of said fluid to absorb said light, a shutter movable to increase and to decrease the amount of light transmitted to one of said light-sensitive devices, and means operated in response to flow of current in said electrical circuit to move the shutter to restore the relative amounts of light received by the two light-sensitive devices to a predetermined ratio when the relative amounts of light depart from said ratio.

14. Apparatus for testing materials comprising in combination a source of light of wave length such that different amounts of the light are absorbed in passing through bodies of the material of different thickness, two chambers of different thickness for the material to be tested, the thickness of one chamber bearing a predetermined ratio to the thickness of the other chamber, said chambers being transmissive of said light and located with respect to said source so that beams of said light from said source are simultaneously transmitted respectively through bodies of the material of different thickness in said chambers, two light-sensitive devices receiving light transmitted through the respective chambers, an electric circuit connecting said light-sensitive devices in opposition, said circuit comprising a portion through which current from one of said light-sensitive devices tends to flow in one direction and current from the other light-sensitive device tends to flow in the opposite direction, whereby the electrical condition of said circuit depends on the capacity of said material to absorb said light, adjustable means for varying the relative amounts of light received by said light-sensitive devices comprising an opaque element movable to increase and decrease the amount of light transmitted to one of said light-sensitive devices, and means operated in response to flow of current in said circuit portion to move said opaque element to restore the relative amounts of light received by the two light-sensitive devices to a predetermined ratio when the relative amounts of light depart from said ratio.

15. A process of analyzing gaseous fluids containing constituents of different absorbing capacity for light of given wave length, at least one of said constituents being reactive and depositing light-absorbing film when subjected to the influence of said light, which process comprises maintaining two continuously flowing streams of said fluid of different thickness through chambers having walls transmissive of said light in contact with said streams, said fluid being subject to variation in composition, passing two pulsating beams of light of said wave length through the chamber walls and the respective streams, said beams being of such relative intensity that substantially equal films are deposited from said streams on said walls under the influence of said light, photoelectrically controlling an electrical condition in response to variations in the relative amounts of light transmitted through said streams of fluid and controlling an indicator for the proportions in which at least one of said constituents is present in the fluid in response to variations in said electrical conditions.

16. The process of analyzing fluids subject to variation in composition and containing a plurality of constituents of different absorbing capacity for light of given wave length which comprises continuously flowing fluid to be tested from a single source through two chambers having walls transmissive of said light, maintaining bodies of the fluid of different thicknesses from the single source in said chambers, maintaining the flow of fluid from said single source in such manner that the bodies of fluid in said two chambers contain portions of fluid from the original source of substantially the same composition at substantially the same time, passing two beams of light of said given wave length simultaneously through the chamber walls and respective bodies of fluid of different thickness, creating an electrical condition which is a function of the relative amounts of light transmitted through said bodies and indicating said electrical condition.

17. Apparatus for continuously testing fluids containing a plurality of components of different absorbing capacity for light of given wave length, said fluids being subject to variation in composition, comprising in combination, a source of light of wave length such that different amounts of light are absorbed in passing through bodies of the fluid of different thickness, a source of fluid to be tested, two chambers of different thickness having wall portions transmissive of said light, means for continuously passing said fluid from said fluid source to said chambers whereby portions of said fluid of substantially the same composition are contained in said chambers at substantially the same time, said source of light of said wave length positioned to simultaneously direct beams of light through said walls of said chambers, two devices sensitive to light of said wave length, said light source and said transmissive chamber walls and said light-sensitive devices being located so that light passes substantially continuously from said light source through one of said chambers to one of said light-sensitive devices and simultaneously passes substantially continuously from said light source through the other of said chambers to the other of said light-sensitive devices, and an electric circuit connecting said light-sensitive devices in opposition, said circuit involving a portion from which current from one light-sensitive device tends to flow in one direction and current from the other light-sensitive device tends to flow in the opposite direction, whereby the electrical condition of said circuit is a function of the capacity of said fluid to absorb said light.

PERCY W. GUMAER.

REFERENCES CITED

The following references are of record in the file of this patent:

UNITED STATES PATENTS

| Number | Name | Date |
|---|---|---|
| Re. 18,005 | Darrah | Mar. 4, 1931 |
| 1,691,138 | Schmick | Nov. 13, 1928 |
| 1,758,088 | Schmick | May 13, 1930 |
| 2,019,871 | Pettingill | Nov. 5, 1935 |
| 2,035,649 | Goudsmit et al. | Mar. 31, 1936 |
| 2,063,140 | Allison | Dec. 8, 1936 |
| 2,159,181 | Ryder | May 23, 1939 |
| 2,176,013 | Pineo | Oct. 10, 1939 |
| 2,251,149 | Merckel | July 29, 1941 |
| 2,265,357 | Demarest | Dec. 9, 1941 |
| 2,299,529 | Crampton | Oct. 20, 1942 |

OTHER REFERENCES

"The Absorption of Ultraviolet and Visible Light by Water," an article by Sawson et al. in Journal of the Optical Society of America for July 1934; pages 175 to 177. (Copy in Div 7.)

"The Penetration of Ultraviolet Light into Pure Water and Sea Water," an article by E. O. Hulburt in Journal of the Optical Society of America, vol. 17, No. 1, pp. 15 to 22; published July, 1928. (Copy in Div. 7.)

"The Infrared Absorption of Ice," an article by E. K. Plyler in Journal of the Optical Society of America, vol. 9, No. 5, pp. 545 to 555; published Nov. 1924. (Copy in Div. 7.)